United States Patent [19]

Ii et al.

[11] 4,209,398

[45] Jun. 24, 1980

[54] WATER TREATING PROCESS

[75] Inventors: Motohiko Ii, Uji; Yoshio Goto, Takatsuki; Takashi Suzuki, Yokohama; Sotoo Kubo, Tokyo, all of Japan

[73] Assignees: Kurita Water Industries Ltd., Osaka; Sanyo Chemical Industries, Ltd., Kyoto, both of Japan

[21] Appl. No.: 921,752

[22] Filed: Jul. 3, 1978

Related U.S. Application Data

[63] Continuation of Ser. No. 725,180, Sep. 21, 1976, abandoned.

[51] Int. Cl.$^2$ .............................. C02B 5/02; C02B 5/06
[52] U.S. Cl. ..................................... 210/58; 252/180; 252/181; 252/388; 252/389 A; 422/15; 422/17
[58] Field of Search .............................. 210/54, 58, 59; 252/8.55 E, 180, 181, 388, 389 A, 400 A; 422/15–19; 526/240, 277, 278

[56] References Cited

U.S. PATENT DOCUMENTS

| | | | |
|---|---|---|---|
| 3,085,916 | 4/1963 | Zimmie et al. | 210/58 |
| 3,331,773 | 7/1967 | Gunderson et al. | 210/58 |
| 3,449,303 | 6/1969 | Caldwell et al. | 526/240 |
| 3,684,779 | 8/1972 | Rapko | 210/58 |
| 3,699,048 | 10/1972 | Krueger et al. | 210/58 |
| 3,726,812 | 4/1973 | Higashimura et al. | 526/240 |
| 3,766,077 | 10/1973 | Hwa et al. | 422/17 |
| 3,806,451 | 4/1974 | Tate | 210/58 |
| 3,816,333 | 6/1974 | King et al. | 210/58 |
| 3,847,846 | 11/1974 | Asada | 526/240 |
| 3,855,364 | 12/1974 | Steckler | 526/277 |
| 3,880,765 | 4/1975 | Watson | 252/180 |
| 4,026,815 | 5/1977 | Kallfass | 210/58 |

OTHER PUBLICATIONS

Chemical Abstracts, 112750m, vol. 78, 1973.
Chemical Abstracts, 79848u, vol. 85, 1976.
Chemical Abstracts, 79491g, vol. 81, 1974.

*Primary Examiner*—Charles N. Hart
*Assistant Examiner*—Peter A. Hruskoci
*Attorney, Agent, or Firm*—Blanchard, Flynn, Thiel, Boutell & Tanis

[57] ABSTRACT

A water treating agent which comprises a specific polymer containing a structural unit that is derived from a monomer having an ethylenically unsaturated bond and has one or more carboxyl radicals, at least a part of said carboxyl radicals being modified, or another water treating agent which comprises, in addition to said specific polymer, one or more compounds selected from the group consisting of inorganic phosphates, phosphonic acids, organic phosphoric acid esters and polyvalent metal salts, is capable of preventing the formation of corrosion, scale and contamination on the surface of a metal that is in contact with water.

21 Claims, No Drawings

WATER TREATING PROCESS

This is a continuation, of application Ser. No. 725,180 filed Sept. 21, 1976, now abandoned.

BACKGROUND OF THE INVENTION

1. Field of the Invention

The present invention relates to a water-treating process for preventing the formation of corrosion, scale and contamination on the surface of a metal that is in contact with water, particularly for preventing the formation of corrosion, scale and contamination in or on industrial heat exchangers, metal tubes in a cooling water system, surfaces that contact flowing water, the heating surfaces of boilers, heat-distillation type sea water desalting apparatus, and dust collectors and associated piping in a dust collecting system in iron and steel manufacturing industries.

2. Description of the Prior Art

Water fed to industrial heat exchangers and other cooling water systems contains a small quantity of suspended substances and slightly soluble inorganic salts such as carbonates, sulphates and silicates of calcium and magnesium.

In a cooling water system having a cooling tower and a heat exchanger, the circulating water is cooled by evaporation of a part of the water passing through the cooling tower. Owing to the evaporation, dissolved inorganic salts and suspended substances in the feed water are condensed in the circulating water and are deposited onto the heating surface of the heat exchanger to form scale thereon. Furthermore industrial heat exchangers, cooling water systems or the like made of carbon steel corroded by the attack of dissolved oxygen, especially the scale and portions having contamination adhered thereto corrode due to the formation of an oxygen concentration cell. Adhesion of such scale, contamination and corrosion products brings about a lowering of the heat transfer rates of heat exchangers and decreases the circulation rate of cooling water owing to increase of the pressure loss, that is, a lowering of the cooling efficiency, and further serious difficulties such as clogging of tubes of heat exchangers, penetration accident of tubes caused by local corrosion thereof, etc., which possibly lead to a temporary stoppage the operation of the apparatus.

Various kinds of scale inhibitors have been used to prevent the precipitation and adhesion of scale and contamination as aforesaid. As such scale inhibitors there are known lignin derivatives for instance, sodium ligninsulfonate, inorganic phosphorous compounds such as tri-poly phosphoric acid, pyrophosphoric acid, hexametaphosphoric acid, etc., organic phosphorous compounds such as alkyl phosphate, alkyl phosphite, etc. and polyacrylates. However, each of them is deficient in that the lignin derivatives, being natural products, are not stable in quality and are liable to color, and inorganic or organic phosphorous compounds cause the formation of scale in the presence of polyvalent metal ions such as calcium ions, and polyacrylates are inferior in the scale inhibiting effect, especially in inhibiting the formation of phosphatic scales.

As corrosion inhibitors chrome (VI) compounds are used, but they involve problems of danger to health and environmental pollution. In order to overcome such a problem, there have been utilized inorganic polyphosphoric acids, phosphonic acids, organic phosphoric acid esters, and polyvalent metal salts, such as Zn (II) ions and, Ni (II) ions. However inorganic polyphosphoric acids, phosphonic acids and organic phosphoric acid esters, when they are used in low concentration, adversely act so as to enhance corrosion, and when added in high concentrations, lead to the formation of scale. In more detail, the inorganic polyphosphoric acids are hydrolyzed in water to produce orthophosphoric acid ions which act upon calcium ions to form insoluble precipitates.

Phosphonic acids and organic phosphoric acid esters are hydrolyzed in cooling water and act upon calcium ions in an alkaline cooling water to form insoluble precipitates which turn into scales. As to the polyvalent metal ions, it is difficult to maintain a predetermined concentration of polyvalent metal ions in an alkaline cooling water, where calcium hardness coexists and the pH is high, and the polyvalent metal ions precipitate as hydroxides, phosphates, phosphonic acid, etc. Such phenomena vary depending on the cooling water temperature, and become greater when the calcium hardness increases and the pH rises. Therefore, it is necessary to determine the guantities of corrosion inhibitors added depending on the cooling water temperatures, as well as utilizing a cooling water which is low in calcium hardness and has a controlled pH. In an industrial cooling water systems, however, it is impossible to prevent corrosion and formation of scales simultaneously and efficiently, because the systems have many heat exchangers in which water temperature are respectively difficult, and the systems use cooling water having a high concentration, which contains relatively high calcium hardness.

SUMMARY OF THE INVENTION

An object of the present invention is to provide a process to prevent scale formation and contamination on the surface of a solid that is in contact with water.

Another object of the present invention is to provide a process to prevent scale formation and contamination on a metal surface which is in contact with water.

Still another object of the present invention is to provide a process to prevent the formation corrosion, scale and contamination in a cooling water system, and to prevent sufficiently the formation of corrosion, scale and contamination by a cooling water of comparatively high calcium hardness even if the water temperature varies.

Another object of the present invention is to use a water treating agent which contains little or no phosphorus in a process for treating water.

The water treating agent of the present invention comprises, as the effective component, a polymer containing a structural unit that is derived from a monomer having an ethylenically unsaturated bend and has one or more carboxyl radicals, at least a part of said carboxyl radicals being modified as represented by the undermentioned general formula, that is, $$-CO(OA)_a X \qquad \text{Formula (1)}$$

or

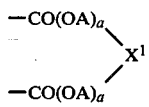

wherein OA is an oxyalkylene radical having 2 to 4 carbon atoms, X is a hydroxyl radical, an alkoxy radical having 1 to 4 carbon atoms or a monovalent phosphate radical, $X^1$ is a bivaler phosphates radical, and a is a positive integer.

The water treating agent of the present invention further comprises one or more kinds of compounds selected from the group consisting of inorganic phosphoric acids, phosphonic acids, organic phosphoric acid esters and polyvalent metal salts together with the above-mentioned water treating agent.

The water treating process of the present invention comprises adding into a water system, the polymer specified by the aforesaid general formula.

The water treating process of the present invention further comprises adding, into a water system, one or more kinds of compounds selected from the group consisting of inorganic phosphoric acids, phosphonic acids, organic phosphoric acid esters and polyvalent metal salts together with the polymer specified by the aforesaid general formula.

DETAILED DESCRIPTION OF THE INVENTION

As the carboxyl radical-containing unit in the aforesaid polymer according to the present invention, there are acrylic acid, methacrylic acid, maleic acid, fumaric acid, itaconic acid, crotonic acid, cinnamic acid, vinyl benzoic acid, etc., and among them are especially effective acrylic acid, methacrylic acid, maleic acid and fumaric acid.

A part of the carboxyl radicals contained in the above unit is required to be modified as represented by the general formula:

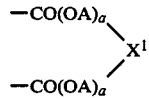

OA represents an oxyalkylene radical having 2 to 4 carbon atoms, such as an oxyethylene radical, an oxypropylene radical, an oxybutylene radical, etc. The oxyalkylene radicals, when being plural, may be different kinds of oxyalkylene radicals. The oxyalkylene radical is especially preferred to be an oxyethylene radical alone or a copolymer of the oxyethylene radical and another oxyalkylene radical, in which either block polymerization or random polymerization is employed. The number of the oxyalkylene radical, namely, "a" is a positive integer, preferably 1 to 10. X represents a hydroxyl radical, an alkoxy radical having 1 to 4 carbon atoms (for instance, methoxy, ethoxy, etc.), or a monovalent phosphoric acid radical and $X^1$ is a bivalent phosphoric acid radical with another X (either phosphoric radical may be a salt or a mono- or di-alkyl ester), said hydroxyl radical and monovalent phosphoric radical being preferred. The bivalent phosphoric acid radical is one as represented by the aforegoing general formula (II).

It is preferable that the unmodified carboxyl radicals among the above-mentioned carboxyl radicals are salts of monovalent cations, because those salts are water-soluble. As the examples of said salts there can be enumerated alkali metal salts (salts of Li, Na, K, etc.), ammonium salts, amine salts (salts of methyl amine, dimethyl amine, ethyl amine, mono-, di- or tri-ethanol amine, methyl ethanol amine and so forth), which may be of one or more kinds. In the case of the modified carboxyl radical there can be enumerated, in addition to the salts as aforesaid, mono- or di-methyl ester, mono- or di-ethyl ester, mono- or di-propyl ester, mo or di-butyl ester, methyl ester and so forth.

According to the present invention the modification rate of the carboxyl radicals can be varied throughout a vast range, being normally in the range of 10 to 100%, preferably 20 to 50%.

The polymer according to the present invention does not necessarily consist of only the above-mentioned carboxyl radical-containing unit (which contains one modified as represented by general formula (I) or (II)), and it may contain another structural unit (hereinafter called as an optional unit).

As the monomers for the optional units there can be enumerated, for instance, esters of (meth)acrylic acids such as methyl(metha acrylate, ethyl(meth)acrylate, butyl(meth)acrylate, 2-ethyl hexyl(meth)acrylate, dimethyl amino(meth)acrylate, diethyl aminoethyl(meth)acrylate, etc.; styrenic compounds such as styrene, α-methyl styrene, etc.; fatty acid esters of vinyl alcohols such as vinyl acetate, vinyl propionate, etc.; (meth)acrylamides, (meth)acrylonitriles and so forth.

The ratio of the carboxyl radical containing unit [which contains one modified as represented by general formula (I) or (II)] to the optional unit which may be varied, is usually in the range of 50 to 99:1 to 50 in molar ratio, preferably 80 to 99:1 to 20. In case the optional units are over 50 mole percent they bring about an undesirable result because the efficiency of the resulting product as the water treating agent is lowered. The polymers according to the present invention may be cited as below;

Sodium salt of an acrylic acid/2-hydroxy ethyl methacrylate/methyl acrylate copolymer
  (weight ratio 70:26:4)
Sodium salt of an acrylic acid/2-hydroxy ethyl methacrylate monophosphate copolymer
  (weight ratio 55:45)
Sodium salt of an acrylic acid/2-hydroxy propyl acrylate/2-hydroxy propyl acrylate monophosphate copolymer
  (weight ratio 50:10:40)
Sodium salt of an acrylic acid/2-hydroxy ethyl methacrylate/acrylonitrle copolymer
  (weight ratio 40:40:20)
Sodium salt of a maleic acid/acrylic acid/2-hydroxy ethyl methacrylate copolymer
  (weight ratio 30:40:30)
Sodium salt of an itaconic acid/2-hydroxy ethyl methacrylate/acrylamide copolymer
  (weight ratio 40:30:30)

The above enumerated polymers constituting the water treating agent of the present invention may be produced in various manners, for instance they may be obtained by polymerization of a carboxyl radical-containing monomer and a co-monomer at a temperature of about 40° to 150° C. in the presence of a polymerization initiator (for instance a peroxide such as benzoyl peroxid or the like, an azo compound such as azobisisobutylonitrile or the like, or a persulfate such as sodium persulfate or the like).

As methods of modifying the carboxyl radical in this instance there are a method in which the monomer, after having been modified in advance, is subjected to polymerization, and another method in whick said monomer is subjected to polymerization without modification of it and then the carboxyl radicals are modified after the polymerization, both being employable.

However modification of a polymer is very difficult because the polymer is highly viscous. Therefore, it is preferable to modify the carboxyl radicals in the state of having a relatively low molecular weight.

The polymer thus obtained according to the present invention is a colorless or lemon-yellow liquid or a solid, water-soluble polymer, the viscosity of which is in the range of 100 to 2000 centipoises (measured of 50% aqueous solution at 30° C.). The average molecular weight of the polymer may range from 500 to 200,000.

This polymer exhibits a superior effect as the water treating agent and when added into water, can prevent scale formation. This polymer exhibits a superior effect in preventing the deposition of soluble salts and dispersing suspended particles, especially in preventing the formation of phosphatic scales. This polymer may be added directly into various kinds of cooling waters and boiler waters in a fixed quantity and in the state of a aqueous solution, continuously or intermittently. The quantity of the polymer added is to be determined depending on the uses, purpose and so forth, but generally speaking, a satisfactory effect can be attained with this polymer present in water in a quantity ranging from 0.1 to 1000 ppm, preferably 1 to 100 ppm.

The polymer according to the present invention can achieve a satisfactory effect when used solely, but in order to inhibit corrosion as well as scale formation and contamination, it is preferable to use the polymer in combination with one or more kinds of compounds selected from inorganic phosphoric acids, phosphonic acid salts, organic phosphoric acid esters, and polyvalent metal salts in addition to the above specified polymer.

The inorganic phosphoric acids in combination with the aforesaid polymer in the present invention are those as represented by general formula to follow, $$XMnO \cdot YP_2O_5 \quad (III)$$

wherein M represents hydrogen or a monovalent or bivalent metal (which includes alkali metal and alkali earth metal), n is an integer of 1 or 2, X and Y are positive numbers, and X/Y is over zero to 3.

As the specified examples of said inorganic phosphoric acids there are enumerated phosphoric acids, condensed phosphoric acids and water-soluble salts thereof; the phosphoric acids, include an orthophosphoric acid, a primary phosphoric acid and a secondary phosphoric acid; and the inorganic condensed phosphoric acids include polyphosphoric acids such as pyrophosphoric acid, tripolyphosphoric acid and the like, metaphosphoric acids such as trimetaphosphoric acid, tetrametaphosphoric acid and the like, and ultraphosphoric acids. The phosphonic acids to be used in combination with the aforesaid polymer in the present invention are those as represented by general formulas to follow,

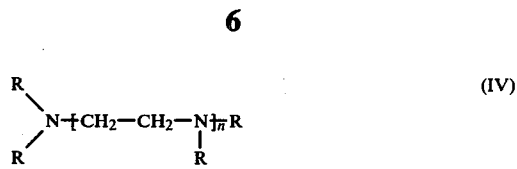

wherein at least one R is

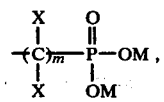

and other is selected from the group consisting of

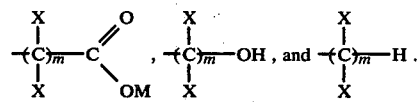

n is zero or an integer of 1 to 5 and m is an integer of 1 to 5, and

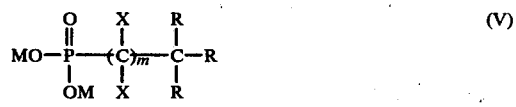

wherein R is selected from the group consisting of

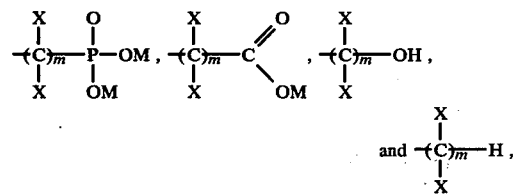

and m is zero or an integer of 1 to 5.

In general formulas (IV) and (V), X is selected from the group consisting of H, —OH,

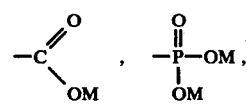

and alkyl radicals having 1 to 4 carbon atoms, and M is selected from the group consisting of H, $NH_4$, and alkali metal.

As the phosphonic acids represented by general formula (IV) there are aminopoly phosphonic acids such as aminotrimethylene phosphonic acid, ethylene diamine tetramethylene phosphonic acid and the like, and the phosphonic acids represented by general formula (V) include methylene diphosphonic acid, hydroxy ethylidene diphosphonic acid, 2-phosphono-butane tricarboxylic acid-1,2,4.

The organic phosphoric acid esters to be used in combination with the aforesaid polymer are compounds represented by the under-mentioned general formula (VI) or (VII), in which at least one to substantially all of the hydroxyl radicals are substituted with a phosphoric acid ester and said phosphoric esters comprises one or both of

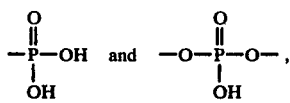

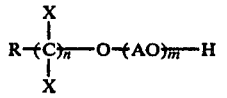

wherein R is H or alkyl radical having 1 to 8 carbon atoms, X is selected from H, —O—(AO)$_{\overline{m}}$H or alkyl radical having 1 to 4 carbon atoms, A is

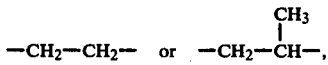

n is a positive integer, and m is zero or an integer not less than 1,

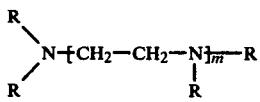

wherein R is H or

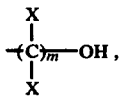

at least one of R being

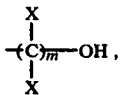

X is one selected from H, —OH or alkyl radical having 1 to 4 carbon atoms, and m is zero or an integer not less than 1.

The organic phosphoric acid esters derived from the hydroxyl compound of general formula (VI) include phosphoric acid esters of alkyl alcohols such as methyl phosphoric acid ester, ethyl phosphoric acid ester, etc., phosphoric acid esters of methyl cellosolve and ethyl cellosolve, and phosphoric acid esters of polyoxyalkylated polyhydroxy compounds obtained by adding ethylene oxide to polyhydroxy compounds such as glycerol, mannitol, sorbitol, etc. As the organic phosphoric acid esters derived from the compounds according to general formula (VII) there are phosphoric acid esters of the respective amino alcohols of such as mono-, di-, and tri-ethanol amines.

Inorganic phosphoric acid, phosphonic acid, and organic phosphoric acid esters may be salts, preferably salts of alkali metal, ammonia, amine and so forth.

And as polyvalent metal salts to be used in combination with the aforesaid polymer there are enumerated those capable of dissociating polyvalent metal ions in water such as Zn (II) ion, Ni (II) ion and so forth, which include zinc chloride, zinc sulfate, nickel sulfate, nickel chloride and so forth.

When the aforesaid polymer is added in the water system in combination with a compound or compounds selected from the group of inorganic phosphoric acids, phosphonic acids, organic phosphoric acid esters, their water-soluble salts (hereinafter called as phosphoric compounds) and polyvalent metal salts, a fixed quantity of said polymer may be added in the state of aqueous solution into the system, where water is being treated with phosphoric compounds or polyvalent metal salts, separately from those chemicals, and continuously or intermittently. Alternatively the polymer may be blended with phosphoric compounds or polyvalent metal salts and then added in the state of aqueous solution into the water system continuously or intermittently. Phosphoric compounds or polyvalent metal salts are utilized in the usual manner for corrosion and scale preventing purposes. For instance, the phosphoric compounds or polyvalent metal salts may be added to a water system continuously or intermittently to maintain their necessary concentrations.

Good results are obtained with the phosphoric compounds present in water in an amount of the range from about 1 to 100 ppm (as PO$_4$), or polyvalent metal salts from 1 to 50 ppm (as metal ion).

In order to prevent corrosion, first the phosphoric compounds or polyvalent metal salts may be added, as pretreatment dosage, to the water system in an amount of about 20 to about 500 ppm, and thereafter a small quantity of chemicals may be added, as maintenance dosage. The polymer may be used in combination with conventional corrosion inhibitors for iron, steel copper, copper alloys or other metals, conventional scale and contamination inhibitors, metal ion sequestering agents, and other conventional water treating agent. As such corrosion inhibitors there can be enumerated chromates, bichromates, tungstate, molybdates, nitrites, borates, silicates, oxycarboxylic acids, amino acids, catechols, aliphatic amino surface active agents, benzo triazole, and mercaptobenzothiazole. As scale and contamination inhibitors there can be enumerated lignin derivatives, tannic acids, starch, polyacrylic soda, polyacrylic amide. As metal ion sequestering agents there can be enumerated polyamines such as ethylene diamine, diethylene triamine and the like and polyamino carboxylic acids such as nitrilo triacetic acid, ethylene diamine tetra acetic acid, diethylene triamine pentaacetic acid.

The quantity of the polymer to be added into the water system together with phosphoric acid compounds and polyvalent metal salts varies depending on the quality of water such as the calcium hardness, M-alkalinity, pH, and the like, the highest water temperature and so forth and should be determined to hold the phosphoric compounds and polyvalent metal ions stably in the water. The sufficiently effective concentration of the polymer is usually 0.1 to 1000 ppm. In case the concentration of said phosphoric compounds and polyvalent metal salts are high like pretreatment dosage, the polymer is preferably added, in an amount of 30 to 300 ppm. In case the concentration of the phosphoric compounds and polyvalent metal salts are relatively low maintenance dosage, the polymer is preferred to be added in an amount of 1 to 50 ppm.

The use of the polymer in combination with the aforesaid phosphoric compounds and/or polyvalent metal salts, improves the anti-corrosive effect thereby as well as preventing the effect of scale formation and contamination. This is considered to be brought about due to the fact that the polymer strongly prevents the phosphoric compounds and polyvalent metals from becoming insoluble compounds and precipitating, therefore the concentrations of the phosphoric compounds and/or polyvalent metals can be maintained in a high degree. Thus, the water treating agent of the present invention is able to exhibit a sufficient corrosion preventability. This function and effect can be manifested especially in the system where the hardness and pH of the water are high, therefore it is possible to apply the agent of the present invention even to the places to which the application of conventional agents is usually difficult or ineffective. In case the water treating agent of the present invention is applied to the system where the water temperature varies, the addition of the agent in the required concentration at the low-temperature places can prevent corrosion at any place and eliminate any possibility of the phosphoric compounds, polyvalent metal, etc. precipitating and being converted into scales.

The present invention is hereinafter explained by reference to examples, but it is to be noted that the present invention should not be restricted only thereto.

EXAMPLE 1

A test was carried out on polymers A to F as represented by general formula which constitute the water treating agent of the present invention and the control article sodium hexametaphosphate in order to investigate their scale inhibiting effects.

As a result of the test it was recognized that the water treating agent according to the present invention was superior in scale inhibiting effect to the control article as shown in the following table.

Table 1

| Water treating agent | Concentration (p.p.m.) | Quantity of separated calcium carbonate (p.p.m.) | Presence of turbidity or precipitation |
|---|---|---|---|
| A | 0.5 | 3 | yes (white precipitation) |
|   | 2.5 | 0 | no |
|   | 5 | 0 | no |
|   | 10 | 0 | no |
| B | 0.5 | 0 | no |
|   | 2.5 | 0 | no |
|   | 5 | 0 | no |
|   | 10 | 0 | no |
| C | 0.5 | 3 | yes (white precipitation) |
|   | 2.5 | 1 | yes (white precipitation) |
|   | 5 | 0 | no |
|   | 10 | 0 | no |
| D | 0.5 | 5 | yes (white precipitation) |
|   | 2.5 | 5 | yes (white precipitation) |
|   | 5 | 0 | no |
|   | 10 | 0 | no |
| E | 0.5 | 5 | yes (white precipitation) |
|   | 2.5 | 2 | yes (white precipitation) |
|   | 5 | 0 | no |
|   | 10 | 0 | no |
| F | 0.5 | 3 | yes (white precipitation) |
|   | 2.5 | 0 | no |
|   | 5 | 0 | no |

Table 1-continued

| Water treating agent | Concentration (p.p.m.) | Quantity of separated calcium carbonate (p.p.m.) | Presence of turbidity or precipitation |
|---|---|---|---|
|   | 10 | 0 | no |
|   | 1 | 5 | yes (white precipitate) |
| Sodium hexametaphosphate (control) | 5 | 2 | yes (white precipitate) |
|   | 10 | 0 | no |
|   | 20 | 0 | yes (a light white turbidity) |
|   | 40 | 0 | yes (a light white turbidity) |
| blank | — | 60 | yes (white precipitate) |

(Note 1) Compositions of water treating agents A–F
A. Sodium salt of an acrylic acid/2-hydroxy ethyl methacrylate/methyl acrylate copolymer (weight ratio 70:26:4)
B. Sodium salt of an acrylic acid/2-hydroxy ethyl methacrylate mono phosphate copolymer (weight ratio 55:45)
C. Sodium salt of an acrylic acid/2-hydroxy propyl acrylate/2-hydroxypropyl acrylate mono phosphate copolymer (weight ratio 50:10:40)
D. Sodium salt of an acrylic acid/2-hydroxy ethyl methacrylate/acrylonitrile copolymer (weight ratio 40:40:20)
E. Sodium salt of a maleic acid/acrylic acid/2-hydroxy ethyl methacrylate copolymer (weight ratio 30:40:30)
F. Sodium salt of an itaconic acid/2-hydroxy ethyl methacrylate/acryl amide copolymer (weight ratio 40:30:30)
(Note 2) Test method of water treating agent A test liquid was prepared which contains 250 p.p.m. of calcium ions as calcium carbonate, and a fixed quantity of each of the water treating agents listed in Table-1 was added to the resulting test liquid and stirred. A further 250 p.p.m. of bicarbonate ions as calcium carbonate was added to the same with stirring, and was uniformly dissolved. Thereafter the pH of said liquid was regulated to be 8.5. This test liquid was maintained at 60° C., and was left standing for 20 hours. After 20 hours' standing still the test liquid was observed with the naked eye to investigate the presence of precipitates of turbidity. Further, the test liquid was filtered using a 5 c filter paper, and the obtained filtrate was subjected to Ca concentration measurement using ethylene diamine tetra acetate-2 sodium salt (EDTA-2Na) to thereby calculate the quantity of separated calcium carbonate

EXAMPLE 2

Water (Yokohama tap water) was fed to an open circulating cooling water system including a heat exchanger and a cooling tower so that the concentration multiple is 5. A run was made in such a situation and under the conditions as follows.

| Running conditions | |
|---|---|
| Heat exchanger: | Stainless steel tube JIS SUS 304 TB two, heating area about 0.25 m² |
| Holdup water: | 0.45 m³ |
| Circulating water temperature: | inlet temperature 30° C. outlet temperature 55° |
| Circulating water flow rate: | 0.5m/sec (within the heat exchanger) |
| Quality of circulating water: | Electric conductivity 1.040 μU /cm, pH 8.4 overall hardness 390 p.p.m. (as CaCO₃), Ca hardness 250 p.p.m. (as CaCO₃), M alkalinity 200 p.p.m. (as CaCO₃) |

The water treating agents were added to this open circulating cooling water system at its pit so that their concentrations in the circulating water may be 5 p.p.m., and 30 days' run was operated.

After completion of this run, the heat exchanger tubes were taken out to measure the quantity of adhered scale per unit area of the tube.

In the case of test number-1 the test was carried out without chemical addition, and in the cases of test number-2 and 3 the tests were carried out by adding sodium hexametaphosphate and sodium polyacrylate, whose molecular weight was about 8000, respectively for comparison purposes. In the cases of test number-4, 5 and 6 the tests were carried out by adding the water treating agents A, B and D employed in Example 1 respectively. The results thus obtained are as shown in Example 2.

Table 2

| Test number | Addition agent | Concentration (p.p.m.) | Quantity of adhered scales (mg/cm$^2$) |
|---|---|---|---|
| 2-1 | none | — | 28.2 |
| 2-2 | Sodium hexametaphosphate | 5 | 11.8 |
| 2-3 | Sodium polyacrylate | 5 | 14.6 |
| 2-4 | A | 5 | 7.9 |
| 2-5 | B | 5 | 6.8 |
| 2-6 | D | 5 | 10.3 |

EXAMPLES 3 to 5

As a model cooling water system was employed an open circulating cooling water system having holdup water of 0.45 m$^3$ and equipped with a heat exchanger whose heating area is about 0.25 m$^2$, and the circulating water flowing at a rate of 0.5 m/sec within the carbon steel tube of said heat exchanger was heated by the vapour flowing along the shell side against the circulating water. The inlet vapour temperature was 130° to 140° C., and the outlet vapour temperature was 90° to 100° C. The temperature of the circulating water at the inlet was 30° C., and that at the outlet was 55° C. The heating quantity in this instance was about 66,000 kcal/m$^2$/hr. As the feed water there was used Yokohama tap water. Chemicals were added continuously in a fixed quantity into the cooling tower at the pit so that a predetermined concentration may be maintained in the water. The effects of the present invention were evaluated on the basis of the scaling rate (mg/cm$^2$/month) of scales adhered to the tube of the heat exchanger and the corrosion rate (mg/cm$^2$/day) formed on the surface of a mild steel plate dipped in the return tube in the model cooling water system.

Table 3

| | | Yokohama tap water |
|---|---|---|
| Conductivity | ($\mu$U /cm) | 190 |
| pH | | 7.2 |
| Overall hardness | (as CaCO$_3$) | 73 ppm |
| Ca hardness | (as CaCO$_3$) | 45 ppm |
| M-alkalinity | (as CaCO$_3$) | 42 ppm |
| Chloride ion | (as Cl$^-$) | 14 ppm |
| Sulfate ion | (as SO$_4^{2-}$) | 27 ppm |
| Silica | (as SiO$_2$) | 24 ppm |

EXAMPLE 3

The model cooling water system was run without forced blow, and the test term was fixed as the period of two days for which the quality of the circulating water was condensed two times that of the feed water. As shown in Table-4, chemicals were added into the cooling water system at the pit so as to maintain their concentrations at relatively high degrees therein to thereby measure the scaling rate and corrosion rate. The obtained results are as shown in Table-4. The measured results proved that the method of the present invention was exceedingly improved in the scale and contamination preventing effects as compared with prior art methods.

EXAMPLE 4

The model cooling water system was run for initial two days under the same running conditions as in Example 3 and the chemical concentration was maintained relatively high. Thereafter, the forced blow and the quantity of added chemical shown in Table-5 were regulated so that the quality of the recirculating water might be maintained equivalent to two times of that of the feed water. After the test term of 30 days lapsed, measurement was made with reference to the scaling rate and corrosion rate, and the obtained results were shown in Table-5.

EXAMPLE 5

The model cooling water system was run for initial two days under the same running conditions as in Example 3, and thereafter the quantity of forced blow and the quantity of added chemical as shown in Table-6 were regulated so that the quality of the recirculating water might be maintained equivalent to five times of that of the feed water. After the test term of 30 days, measurement was made with reference to the scaling rate and corrosion rate, and the obtained results were shown in Table-6.

Table 4

| Test number | Addition agent | Concentration (ppm) | Scaling rate (mg/cm$^2$/month) | Corrosion rate (mdd) |
|---|---|---|---|---|
| 3-1 | Sodium tripolysulphate | 100 | 57.6 | 10.6 |
| 3-2 | Sodium tripolysulphate<br>Sodium polyacrylate | 100<br>50 | 48.8 | 11.4 |
| 3-3 | Sodium tripolyphosphate<br>Water treating agent A | 100<br>50 | 19.0 | 5.9 |
| 3-4 | Sodium tripolyphosphate<br>Water treating agent B | 100<br>50 | 17.1 | 5.2 |
| 3-5 | Sodium tripolyphosphate<br>Water treating agent D | 100<br>50 | 20.8 | 6.6 |
| 3-6 | Sodium hexamethaphosphate<br>Zinc anhydrous sulfate | 80<br>50 | 53.0 | 7.8 |
| 3-7 | Sodium hexamethaphosphate<br>Zinc anhydrous sulfate<br>Sodium polyacrylate | 80<br>50<br>50 | 52.7 | 7.4 |
| 3-8 | Sodium hexamethaphosphate<br>Zinc anhydrous sulfate | 80<br>50 | | |

Table 4-continued

| Test number | Addition agent | Concentration (ppm) | Scaling rate (mg/cm²/month) | Corrosion rate (mdd) |
|---|---|---|---|---|
| 3-9 | Water treating agent A | 50 | 21.9 | 5.9 |
|  | Sodium hexamethaphosphate | 80 |  |  |
|  | Zinc anhydrous sulfate | 50 |  |  |
|  | Water treating agent B | 50 | 18.5 | 4.2 |
| 3-10 | Sodium hexamethaphosphate | 80 |  |  |
|  | Zinc anhydrous sulfate | 50 |  |  |
|  | Water treating agent D | 50 | 20.0 | 4.8 |

Table 5

| Test number | Addition agent | Initial concentration (ppm) | Maintained concentration (ppm) | Scaling rate (mg/cm²/month) | Corrosion rate (mdd) |
|---|---|---|---|---|---|
| 4-1 | none | — | — | 193.5 | 168.7 |
| 4-2 | Sodium tripolyphosphate | 100 | 25 | 64.8 | 17.8 |
| 4-3 | Sodium tripolyphosphate | 100 | 25 |  |  |
|  | Water treating agent A | 50 | 5 | 16.5 | 3.4 |
| 4-4 | Amino trimethylene phosphonic acid | 100 | 20 | 35.7 | 10.5 |
| 4-5 | Amino trimethylene phosphonic acid | 100 | 20 |  |  |
|  | Water treating agent A | 50 | 5 | 12.5 | 5.4 |
| 4-6 | Hydroxy ethylidene diphosphonic acid | 100 | 20 | 32.4 | 9.6 |
| 4-7 | Hydroxy ethylidene diphosphonic acid | 100 | 20 |  |  |
|  | Water treating agent D | 50 | 5 | 10.3 | 4.3 |
| 4-8 | Sodium hexamethaphosphate | 80 | 16 |  |  |
|  | Zinc anhydrous sulfate | 50 | 10 | 58.4 | 12.7 |
| 4-9 | Sodium hexamethaphosphate | 80 | 16 |  |  |
|  | Zinc anhydrous sulfate | 50 | 10 |  |  |
|  | Water treating agent D | 50 | 5 | 8.6 | 3.7 |
| 4-10 | Hydroxy ethylidene diphosphonic acid | 65 | 26 |  |  |
|  | Zinc anhydrous sulfate | 25 | 10 | 42.6 | 11.9 |
| 4-11 | Hydroxy ethylidene diphosphonic acid | 65 | 26 |  |  |
|  | Zinc anhydrous sulfate | 25 | 10 |  |  |
|  | Water treating agent A 50 | 5 | 6.6 | 4.2 |  |
| 4-12 | Citric acid | 150 | 30 |  |  |
|  | Zinc anhydrous sulfate | 35 | 7 | 37.5 | 28.7 |
| 4-13 | Citric acid | 150 | 30 |  |  |
|  | Zinc anhydrous sulfate | 35 | 7 |  |  |
|  | Water treating agent D | 50 | 5 | 6.9 | 10.5 |

Table 6

| Test number | Addition agent | Initial concentration (ppm) | Maintained concentration (ppm) | Scaling rate (mg/cm²/month) | Corrosion rate (mmd) |
|---|---|---|---|---|---|
| 5-1 | none | — | — | 231.6 | 116.0 |
| 5-2 | Hydroxy ethylidene diphosphonic acid | 100 | 5 | 20.6 | 16.2 |
| 5-3 | Hydroxy ethylidene diphosphonic acid | 100 | 5 |  |  |
|  | Water treating agent A | 50 | 10 | 6.7 | 5.5 |
| 5-4 | Hydroxy ethylidene diphosphonic acid 2 sodium salt | 65 | 5 |  |  |
|  | Zinc anhydrous sulfate | 25 | 7.5 | 43.5 | 12.7 |
| 5-5 | Hydroxy ethylidene diphosphonic acid 2 sodium salt | 65 | 5 |  |  |
|  | Zinc anhydrous sulfate | 25 | 7.5 |  |  |
|  | Water treating agent B | 50 | 10 | 7.7 | 5.4 |
| 5-6 | 1,2,4-carboxy-2-phosphonic acid type butane | 50 | 5 |  |  |
|  | Zinc anhydrous sulfate | 25 | 7.5 | 27.8 | 20.2 |
| 5-7 | 1,2,4-carboxy-2-phosphonic acid type butane | 50 | 5 |  |  |
|  | Zinc anhydrous sulfate | 25 | 7.5 |  |  |
|  | Water treating agent A | 50 | 10 | 4.6 | 8.3 |
| 5-8 | Organic phosphoric acid ester A | 80 | 25 |  |  |
|  | Zinc anhydrous sulfate | 25 | 7.5 | 55.8 | 32.4 |
| 5-9 | Organic phosphoric acid ester A | 80 | 25 |  |  |
|  | Zinc anhydrous sulfate | 25 | 7.5 |  |  |
|  | Water treating agent D | 50 | 10 | 12.4 | 16.6 |
| 5-10 | Organic phosphoric acid ester B | 100 | 30 |  |  |
|  | Zinc anhydrous sulfate | 25 | 7.5 | 45.6 | 27.5 |
| 5-11 | Organic phosphoric acid ester B | 100 | 30 |  |  |
|  | Zinc anhydrous sulfate | 25 | 7.5 |  |  |

Table 6-continued

| Test number | Addition agent | Initial concentration (ppm) | Maintained concentration (ppm) | Scaling rate (mg/cm²/month) | Corrosion rate (mmd) |
|---|---|---|---|---|---|
| | Water treating agent A | 50 | 10 | 17.8 | 10.8 |

Organic phosphoric acid ester A: Phosphoric acid ester of triethanol amine.
Organic phosphoric acid ester B: Phosphoric acid ester of oxyethylified glycerol.

What is claimed is:

1. A process for treating water to inhibit formation of scale and deposits on surfaces in contact with the water and to minimize corrosion of said surfaces, which comprises: mixing in the water
   (a) an effective amount of water-soluble polymer having a molecular weight of from 500 to 200,000, said polymer consisting essentially of structural units derived from a monomer having an ethylenically unsaturated bond and one or more carboxyl radicals wherein from 10 to 100% of said carboxyl radicals are modified to have the formula —CO(OA)$_a$X or the formula

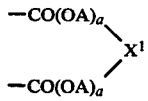

wherein OA is oxyalkylene having 2 to 4 carbon atoms; X is hydroxy, alkoxy having 1 to 4 carbon atoms or monovalent phosphate radical; X$^1$ is a divalent phosphate radical; and "a" is a positive integer; and wherein the remainder of said carboxyl radicals are water-soluble salts thereof with monovalent cations; and
   (b) an effective amount of one or more corrosion inhibitor compounds selected from the group consisting of inorganic phosphoric acids and water-soluble salts thereof, phosphonic acids and water-soluble salts thereof, organic phosphoric acid esters and water-soluble salts thereof, and polyvalent metal salts capable of being dissociated to polyvalent metal ions in water.

2. A process according to claim 1 in which the amount of said polymer present in the water is maintained in the range of from 0.1 to 1000 ppm.

3. A process according to claim 1 in which (a) the amount of said polymer present in the water is maintained in the range of from 0.1 to 1000 ppm, (b) the amount of said inorganic phosphoric acid and water-soluble salts thereof, phosphonic acids and water-soluble salts thereof, or organic phosphoric acid esters and water-soluble salts thereof present in the water is maintained in the range of from 1 to 100 ppm, calculated as PO$_4$, and the amount of said polyvalent metal salt present in the water is maintained in the range of from 1 to 50 ppm, calculated as the metal ion.

4. A process according to claim 1, wherein said monomer is prepared from a material selected from the group consisting of acrylic acid, methacrylic acid, maleic acid, fumaric acid, itaconic acid, crotonic acid, cinnamic acid, and vinyl benzoic acid.

5. A process according to claim 1 wherein OA is oxyethylene or a copolymer of oxyethylene and a different oxyalkylene.

6. A process according to claim 1, wherein the remainder of said modified carboxyl radicals are in the form of an alkali metal salt, ammonium salt or amine salt.

7. A process according to claim 1, wherein the polymer is a copolymer consisting essentially of said monomer and a another monomer unit selected from the group consisting of esters of acrylic acid and methacrylic acid, styrene compounds, fatty acid esters of vinyl alcohols, acrylamide, methacrylamide, acrylonitrile and methacrylonitrile.

8. A process according to claim 7 wherein the molar ratio of said monomer to said another monomer is in the range of 50–99:1–50.

9. A process according to claim 8, wherein the polymer is selected from sodium salt of an acrylic acid/2-hydroxy ethyl methacrylate/methyl acrylate copolymer, sodium salt of an acrylic acid/2-hydroxy ethyl methacrylate/acrylonitrile copolymer, a sodium salt of maleic acid/acrylic acid/2-hydroxy ethyl methacrylate copolymer and sodium salt of an itaconic acid/2-hydroxy ethyl methacrylate/acrylamide copolymer.

10. A process according to claim 1, wherein said inorganic phosphoric acids have the formula, XM$_n$O·YP$_2$O$_5$ wherein M is hydrogen, alkali metal or alkali earth metal, n is an integer of 1 or 2, X and Y are positive numbers, and X/Y is from more than zero up to 3.

11. A process according to claim 10, wherein said inorganic phosphoric acid is selected from the group consisting of orthophosphoric acid, primary phosphoric acid, secondary phosphoric acid, pyrophosphoric acid, tripolyphosphoric acid, trimetaphosphoric acid, tetrametaphosphoric acid, higher polyphosphoric acid and water soluble salts thereof.

12. A process according to claim 1, wherein said phosphonic acids are aminotrimethylene phosphonic acid or have the formulas (IV) or (V),

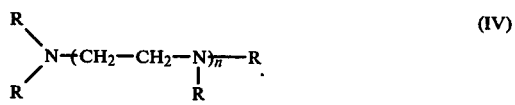

(IV)

wherein at least one R is

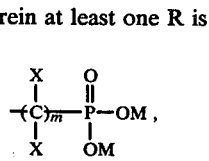

and the other R is selected from the group consisting of

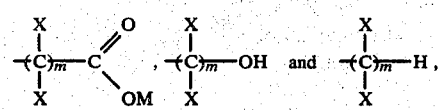

wherein n is zero or an integer of 1 to 5 and m is an integer of 1 to 5,

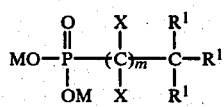 (V)

wherein $R^1$ is selected from the group consisting

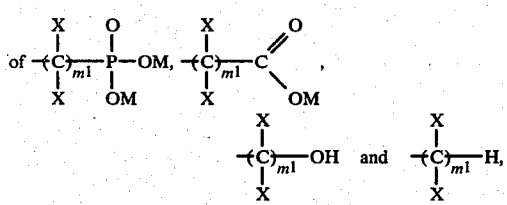

and $m^1$ is an integer of 0 to 5; and in the formulas (IV) and (V), X is selected from the group consisting of H, —OH,

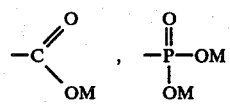

and an alkyl radical having 1 to 4 carbon atoms, and M is selected from the group consisting of H, $NH_4$ and alkali metal.

13. A process according to claim 12, wherein said phosphonic acids having the formula (IV) are selected from the group consisting of aminotrimethylene phosphonic acid and ethylene diamine tetramethylene phosphonic acid, and said phosphonic acids having the formula (V) are selected from the group consisting of methylene diphosphonic acid, hydroxyethylidene diphosphonic acid and 2-phosphono-butane-1,2,4-tricarboxylic acid.

14. A process according to claim 1, wherein said organic phosphoric acid esters are esters of phosphoric acid with a hydroxyl compound having the formulas (VI) or (VII),

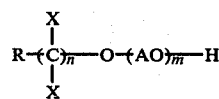 (VI)

wherein R is H or an alkyl radical having 1 to 8 carbon atoms, X is selected from the group consisting of H, —O—(AO)$_{\overline{m}}$H and an alkyl radical having 1 to 4 carbon atoms, A is —CH$_2$—CH$_2$— or

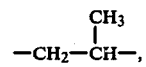

n is an integer not less than 1 and m is zero or an integer not less than 1,

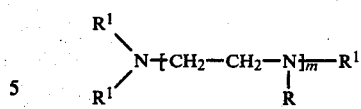 (VII)

wherein $R^1$ is H or

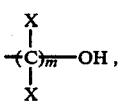

at least one R being

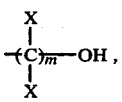

X is selected from the group consisting of H, —OH or an alkyl radical having 1 to 4 carbon atoms, and m is zero or an integer not less than 1, and from at least one to substantially all of the hydroxyl radicals of the hydroxyl compound are substituted with a phosphoric acid ester radical, said phosphoric acid ester radical comprising either one or both of

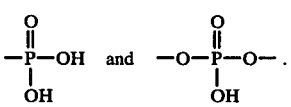

15. A process according to claim 1 in which said polyvalent metal salt is selected from the group consisting of zinc chloride, nickel chloride, zinc sulfate and nickel sulfate.

16. A process as claimed in claim 1 in which the recurring structural units of said polymer are derived from a monomer selected from the group consisting of (1) a monomer selected from the group consisting of acrylic acid, methacrylic acid, maleic acid, fumaric acid, itaconic acid, crotonic acid, cinnamic acid, vinyl benzoic acid and mixtures thereof wherein from 10 to 100% of the carboxyl groups thereof have oxyalkylene units adducted thereto and have the formula —CO(OA)$_a$X, wherein a is a number from one to 10, X is hydroxyl, or alkoxy having one to 4 carbon atoms, and OA is oxyalkylene having from 2 to 4 carbon atoms or mixtures thereof and (2) a mixture of from 50 to 99 molar % of said monomer (1) and the balance is another monomer copolymerized therewith selected from the group consisting of methyl acrylate, methyl methacrylate, ethyl acrylate, ethyl methacrylate, butyl acrylate, butyl methacrylate, 2-ethylhexyl acrylate, 2-ethylhexyl methacrylate, diethylamino acrylate, diethylamino methacrylate, styrene, α-methyl styrene, vinyl acetate, vinyl propionate, acrylamide, methacrylamide, acrylonitrile and methacrylonitrile.

17. A process according to claim 1 in which said monomer is acrylic acid or methacrylic acid.

18. A process according to claim 1 in which said polymer consists of sodium salt of a copolymer of acrylic acid, 2-hydroxyethyl methacrylate and methyl acrylate.

19. A water system having dissolved therein an effective amount of a water treating composition to inhibit formation of scale and deposits on surfaces in contact with the water and to minimize corrosion of said surfaces, said water treating composition comprising:
(a) an effective amount of water-soluble polymer having a molecular weight of from 500 to 200,000, said polymer consisting essentially of structural units derived from a monomer having an ethylenically unsaturated bond and one or more carboxyl radicals wherein from 10 to 100% of said carboxyl radicals are modified to have the formula

or the formula

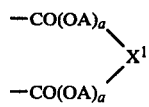

wherein OA is oxyalkylene having 2 to 4 carbon atoms; X is hydroxy, alkoxy having 1 to 4 carbon atoms or monovalent phosphate radical; $X^1$ is a divalent phosphate radical; and "a" is a positive integer; and wherein the remainder of said carboxyl radicals are water-soluble salts thereof with monovalent cations; and
(b) an effective amount of one or more corrosion inhibitor compounds selected from the group consisting of inorganic phosphoric acids and water-soluble salts thereof, phosphonic acids and water-soluble salts thereof, organic phosphoric acid esters and water-soluble salts thereof, and polyvalent metal salts capable of being dissociated to polyvalent metal ions in water.

20. A water system according to claim 19 in which the amount of said polymer present in the water is in the range of from 0.1 to 1000 ppm.

21. A water system according to claim 19 in which (a) the amount of said polymer present in the water is in the range of from 0.1 to 1000 ppm, (b) the amount of said inorganic phosphoric acid and water-soluble salts thereof, phosphonic acids and water-soluble salts thereof, or organic phosphoric acid esters and water-soluble salts thereof present in the water is in the range of from 1 to 100 ppm, calculated as $PO_4$, and the amount of said polyvalent metal salt present in the water is in the range of from 1 to 50 ppm, calculated as the metal ion.

* * * * *